(12) United States Patent
Lopez Garcia et al.

(10) Patent No.: US 11,966,928 B2
(45) Date of Patent: Apr. 23, 2024

(54) INTELLIGENT LEARNING AND APPLICATION OF OPERATIONAL RULES

(71) Applicant: INTERNATIONAL BUSINESS MACHINES CORPORATION, Armonk, NY (US)

(72) Inventors: Vanessa Lopez Garcia, Dublin (IE); Fabrizio Cucci, Dublin (IE); Theodora Brisimi, Dublin (IE); Akihiro Kishimoto, Dublin (IE); Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

(21) Appl. No.: 16/406,856

(22) Filed: May 8, 2019

(65) Prior Publication Data

US 2020/0357001 A1    Nov. 12, 2020

(51) Int. Cl.
*G06Q 30/018* (2023.01)
*G06N 5/02* (2023.01)

(52) U.S. Cl.
CPC ............. *G06Q 30/018* (2013.01); *G06N 5/02* (2013.01)

(58) Field of Classification Search
CPC ........ G06F 19/328; G06N 5/02; G06N 5/025; G06Q 20/4016; G06Q 30/018; G06Q 30/0248
See application file for complete search history.

(56) References Cited

U.S. PATENT DOCUMENTS

| | | | |
|---|---|---|---|
| 7,676,387 B2 | 3/2010 | Childress et al. | |
| 8,245,184 B2 | 8/2012 | Kosov et al. | |
| 10,825,028 B1* | 11/2020 | Kramme | G06Q 20/102 |
| 2001/0034618 A1 | 10/2001 | Kessler et al. | |
| 2005/0137912 A1 | 6/2005 | Rao | |
| 2007/0027674 A1* | 2/2007 | Parson | G06F 40/211 |
| | | | 704/9 |
| 2011/0264612 A1* | 10/2011 | Ryman-Tubb | G06Q 20/4016 |
| | | | 706/12 |
| 2013/0006656 A1 | 1/2013 | Van Arkel et al. | |
| 2013/0054259 A1 | 2/2013 | Wojtusiak | |

(Continued)

FOREIGN PATENT DOCUMENTS

CN    109345399 A    2/2019

OTHER PUBLICATIONS

Petty, Mikel "Introduction to Discrete Structures" University of Alabama in Huntsville, CMSA as archived Jan. 21, 2019; available at: https://web.archive.org/web/20190121172356/https://www.uah.edu/images/research/cmsa/pdf/CS214/CS_214_15S_Chapter_1_v28.pdf (Year: 2019).*

(Continued)

*Primary Examiner* — Brendan S O'Shea
(74) *Attorney, Agent, or Firm* — Daniel G. DeLuca

(57) ABSTRACT

Various embodiments are provided for intelligent application of operational rules to operational data in a computing environment by a processor. One or more operational rules may be extracted and formalized from a knowledge graph, a domain knowledge, or a combination thereof describing one or more operational policies and conditions. The one or more operational rules may be applied to operational data to identify and filter non-compliant operational data.

18 Claims, 8 Drawing Sheets

(56) References Cited

U.S. PATENT DOCUMENTS

| | | |
|---|---|---|
| 2013/0226623 A1 | 8/2013 | Diana |
| 2015/0254583 A1 | 9/2015 | Balko et al. |
| 2016/0110512 A1 | 4/2016 | Adjaoute |
| 2017/0109485 A1 | 4/2017 | Dadey |
| 2019/0057145 A1 | 2/2019 | Huang et al. |
| 2019/0164164 A1* | 5/2019 | Karambakkam .... G06K 9/6218 |
| 2019/0180290 A1* | 6/2019 | Jubete ..................... G06N 5/04 |
| 2019/0377611 A1* | 12/2019 | Khan ..................... G06F 9/5038 |

OTHER PUBLICATIONS

Kose, Ilker, Mehmet Gokturk, and Kemal Kilic. "An interactive machine-learning-based electronic fraud and abuse detection system in healthcare insurance." Applied Soft Computing 36 (2015): 283-299. (Year: 2015).*

Authors: Pandey et al.; Ttl: Analysis and detection of health insurance fraud using data mining and predictive modeling techniques; Conf. Ttl: 1st International Conf. on Soft Computing: Theories and Applications, SoCTA 2016; 2018; Publisher: Springer Verlag; Country of Publication: USA; ISBN: 9789811056987; Database: Ei Compendex(R) ( 9 Pages ).

* cited by examiner

INTELLIGENT LEARNING AND APPLICATION OF OPERATIONAL RULES

BACKGROUND OF THE INVENTION

Field of the Invention

The present invention relates in general to computing systems, and more particularly to, various embodiments for intelligent learning and application of operational rules to operational data using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities.

Digital and online information is an advantageous source of business intelligence that is crucial to an entity's survival and adaptability in a highly competitive environment. Also, many businesses and organizations, such as financial institutions, employing the use of computing systems and online data must ensure operations, practices, and/or procedures are in compliance with general business protocols, corporate compliance, and/or legal regulations, policies, or requirements.

SUMMARY OF THE INVENTION

Various embodiments for implementing intelligent learning and application of operational rules to operational data in a computing environment by a processor are provided. In one embodiment, by way of example only, a method for implementing intelligent application of operational rules, again by a processor, is provided. One or more operational rules may be extracted and formalized from a knowledge graph, a domain knowledge, or a combination thereof describing one or more operational policies and conditions. The one or more operational rules may be applied to operational data to identify and filter non-compliant operational data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
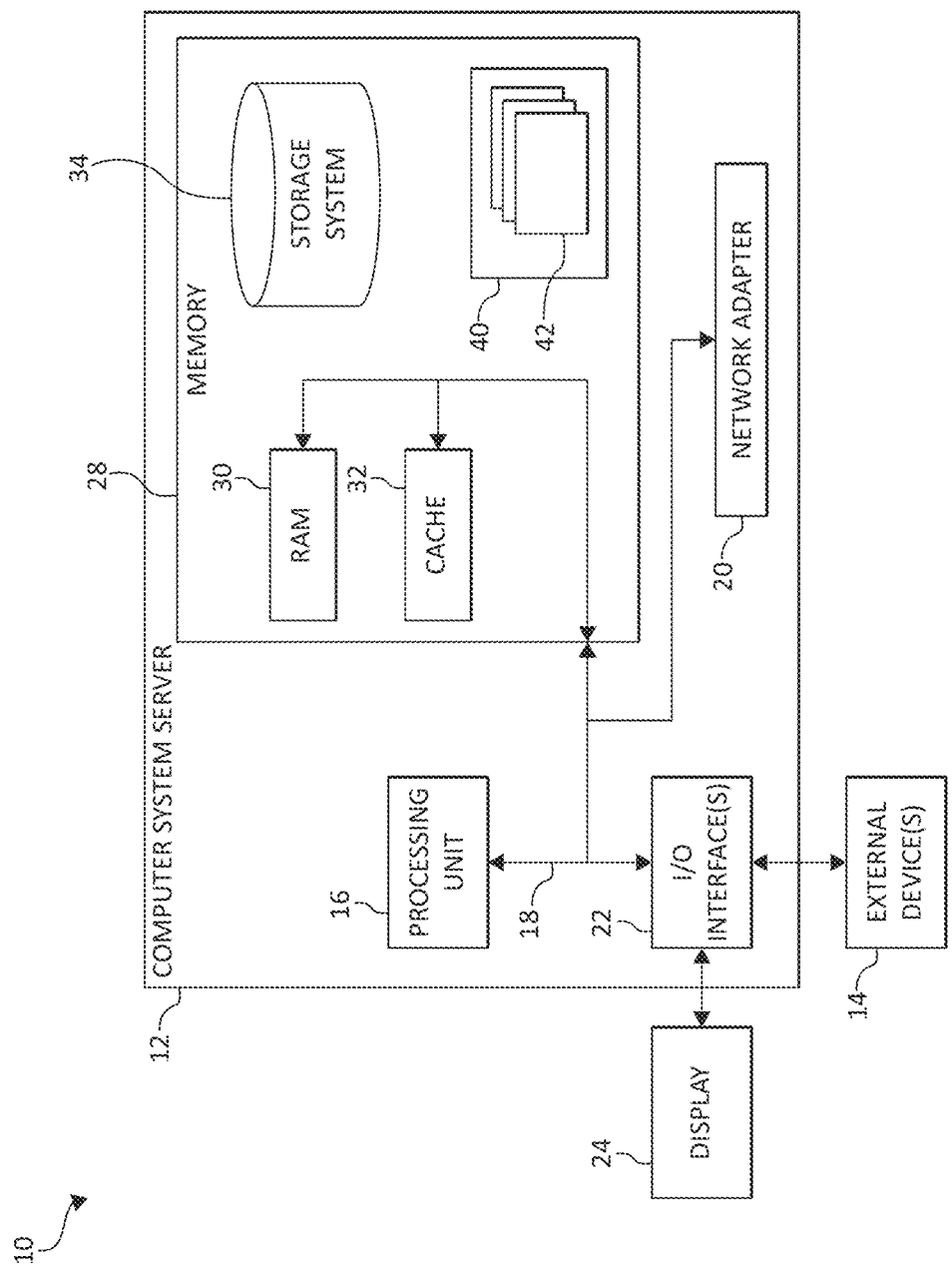
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, some entities (e.g., insurance services offered by insurance companies such as, for example, healthcare industry) are typically accompanied by multiple policies, which describe a number of policy criteria under which these insurance services are applied. For example, in the healthcare industry, providers (as opposed to patients) may send claims directly to health care insurance agencies where such claims must follow specific compliance criteria specified by state and/or federal policies. An example, of policy criteria described in natural language for physical therapy services is "members may receive up to 48 units of any combination of physical therapy or occupational therapy services per 12 month period"). In one aspect, depending on a type of policy, the policy may contain hundreds/thousands of rules, which may be checked (e.g., a policy document may consist of more than 100 pages).

Additionally, providers (e.g., doctors, hospitals, etc.) may submit claims to an entity/payer (e.g., a health insurance agency or a government insurance program) for services rendered to patient. The entity/payer decides to either pay (e.g., valid claim) or reject a submitted claim (e.g., an invalid claim) based on the eligibility criteria for a particular service which are determined by policy guidelines. In one aspect, policy guidelines set out which claims are permissible based on eligibility criteria for a particular service and generally accepted medical practices. Program Integrity investigation units aim to assert that a correct payment has been made for the correct member for a correct service to a correct provider. Often, the investigation is done not at the time the claim is submitted but after the claims had been payed. Fraud, waste and abuse investigators need to prioritize investigations based on likelihood of recovery (in terms of financial recovery of inappropriate paid claims) and maximum return on investigation resources.

In one aspect, an invalid claim may be a claim that violated or infringed upon policy criteria either intentionally (e.g., fraudulent) or unintentionally (providing services unnecessary, inefficient or inconsistent with accepted business practices). The eligibility criteria described in various policies (e.g., healthcare policies) can be modeled as operational rules (e.g., business rules) that describe eligible providers (e.g., required role/license: physicians, nurses, etc.), eligible places of service (e.g., at home, in a hospital), a maximum number of units of service or types of equipment that a provider should report for a single patient in a selected period of time, pairs of services that should not be reported together (in combination) for the same patient in a single date, services unappropriated for the patient age or gender, and the like.

To decide by an entity/payer whether to prioritize an investigation into a submitted claim, investigators need to know where the most recovery is (e.g., in terms of financial recovery) to ensure it is sufficient to warrant further investigation. In order to do so, investigators need to locate and understand the policy documentation. Policy information may include hundreds of pages of unstructured text containing the compliance rules that investigators have to search through, review and reference to support their daily work. Understanding the content of policy and verifying regulation adherence is critical to ensure recovery of inappropriately paid claims, yet costly in terms of time and resource.

Accordingly, the present invention provides for intelligent learning, understanding, and application of operational rules (e.g., business rules) to operational data (e.g., a claim). One or more operational rules may be extracted and formalized from a knowledge graph, a domain knowledge, or a combination thereof describing one or more operational policies and conditions. The operational rules may be applied to operational data to identify and filter non-compliant operational data. Thus, the present invention, as described herein, applies to both scenarios: 1) recovery of inappropriate paid (non-compliant with policy) claims and/or 2) to reject submitted claims.

In one aspect, knowledge may be extracted from one or more policies (e.g., using natural language processing "NLP" operations). The knowledge may be represented in a semi-structured form (e.g., a knowledge graph). One or more operational rules (e.g., business rules) may be extracted from the knowledge graph that represents one or more policy compliance criteria/conditions for the operational data (e.g., a submitted claim). Using the knowledge graph and the operational data, the present invention may build (or assist on the building of) the operational rules (e.g., business rules), which can be applied over the operational data (e.g., semi-structured or structured data) to identify and/or flag non-compliant operational data (e.g., non-compliant claims). The knowledge graph may be extracted from unstructured policies, which may have noise. "Noise" may refer to a knowledge graph that may contain information which might be incorrect. Also there are cases where information may be sometimes correct but not be always correct. This is because the knowledge graph may have been automatically extracted using NLP technologies, that is, the knowledge graph may contain inaccurate or missing information (before it is validated by the user 504 component in FIG. 5, as described below). Initially, one or more weights are assigned to operational rules extracted form knowledge graphs reflect, among other thing, the confidence of the system on the rules being accurate. It should be noted that historical data and/or training data may not be available so a machine learning operation may be performed and/or user feedback may be received to learn an appropriate and/or most applicable rule (head/body part of the rule) that makes a claim uncompliant and/or compliant once the compliance conditions in the knowledge graph are formalized (e.g., by the operational rules builder) into executable rules with a body and a head or the pseudocode rule.

It should be noted that although the current state of the art may perform one or more analytical operations (e.g., text mining, social network analysis, time series analysis, etc.) to identify fraudulent claims in a particular area of focus or industry (e.g., insurance/health care system), the present invention extracts rules from policy data to audit against operational claims data to support policy investigators to identify inappropriate payments by entities/payors to users/ payees (whom may have submitted a fraudulent claim). Thus, the present invention provides novelty over the state of the art by extracting rules from policy data to audit against operational claims data.

In an additional aspect, the present invention may support policy/regulation analytical entities (e.g., a user or business) to identify policy violations and reduce fraud, waste of resources, and/or non-compliant claims by deriving logical executable benefit/operational rules from a knowledge graph representing policy regulations and structured or semi-structured enterprise's operational data (e.g., a claim). The knowledge may be analyzed, interpreted, and/or learned to create operational rules (e.g., business benefit rules) that may (automatically) determine a compliance and/or non-compliance to legal or policy constraints of an enterprise's operations and identify/flag potentially non-compliant claims (e.g., finding claims that violate eligibility criteria for clients based on age and gender). A user may be enabled to verify one or more operational rules (e.g., verify a benefit rule) and may also validate the rules (automatically extracted from knowledge graphs) applied to the operational data (e.g., claims), such as, for example, what makes a correct operational rules (e.g., a business benefit rule). The present invention may use feedback to learn to transform new policy knowledge into operational rules (e.g., business rules) that can execute on top of operational claim data.

Also, as used herein term "domain" is a term intended to have its ordinary meaning. In addition, the term "domain" can include an area of expertise for a system or a collection of material, information, content and/or other resources related to a particular subject or subjects. For example, a domain can refer to a regulatory, legal, policy, governmental, financial, healthcare, advertising, commerce, scientific, industrial, educational, medical, biomedical-specific information, or other area or information defined by a subject matter expert. A domain can refer to information related to any particular subject matter or a combination of selected subjects.

The term "ontology" (which may be included in the domain knowledge) is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, regulatory compliance information, policy information, legal information, governmental information, business information, educational information, or any other information group. The ontology can be continuously updated with the information synchronized with the sources, adding information from the sources to the ontology as models, attributes of models, or associations between models within the ontology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
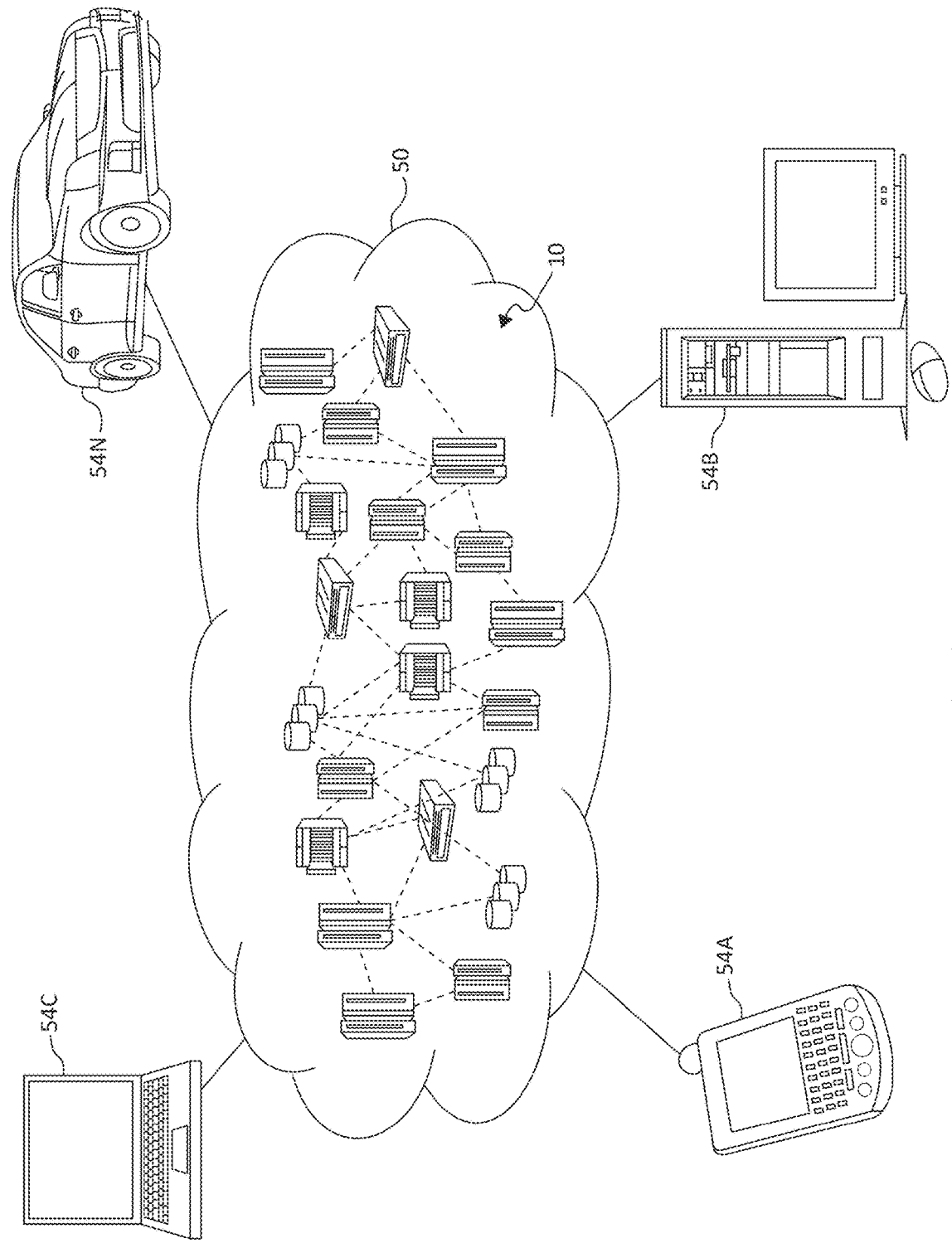
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
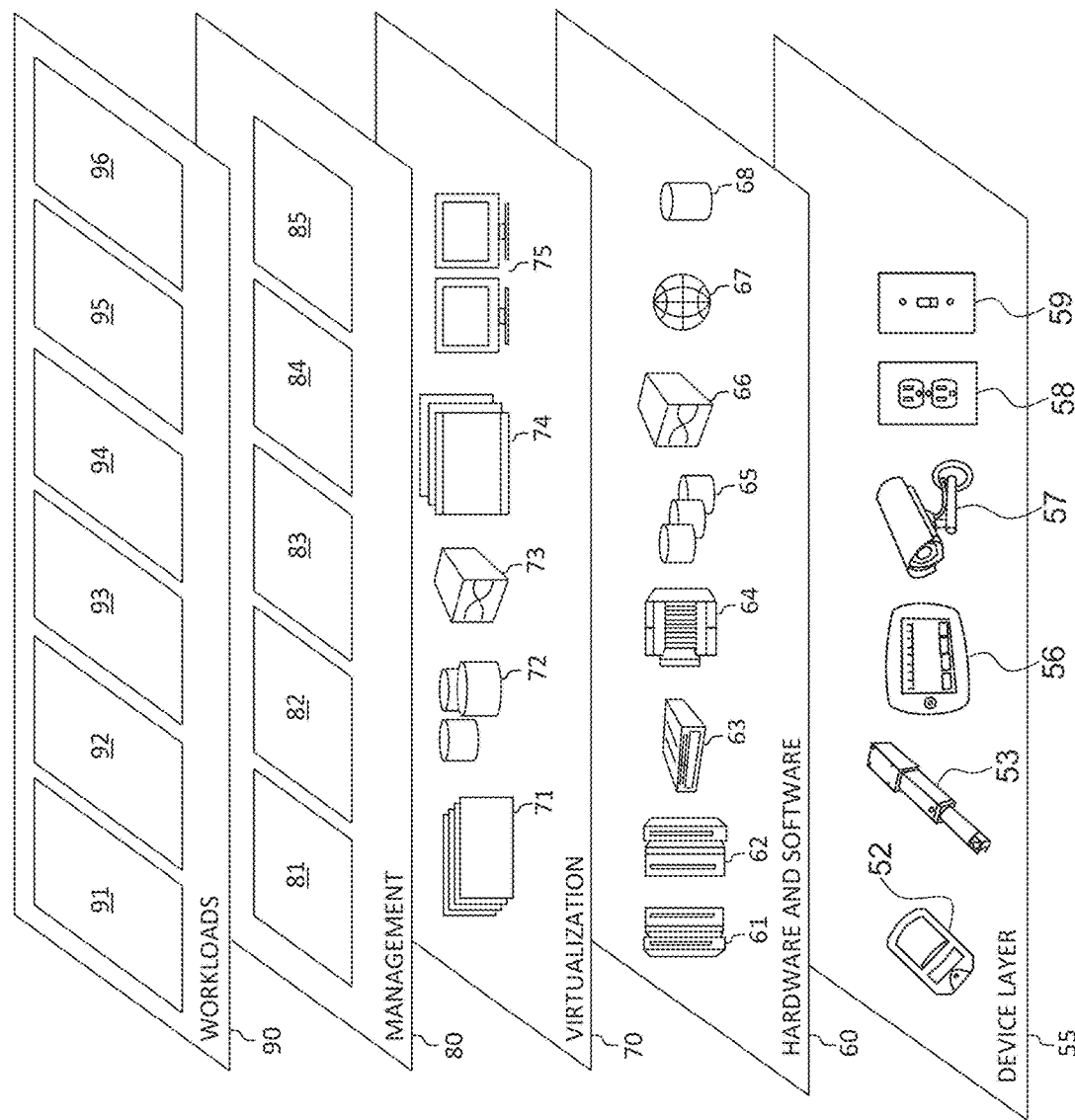
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for correcting policy rules. In addition, workloads and functions 96 for correcting policy rules may include such operations as analytics, entity and obligation analysis, and as will be further described, user and device management functions. One of ordinary skill in the art will appreciate that the workloads and functions 96 for correcting policy rules may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
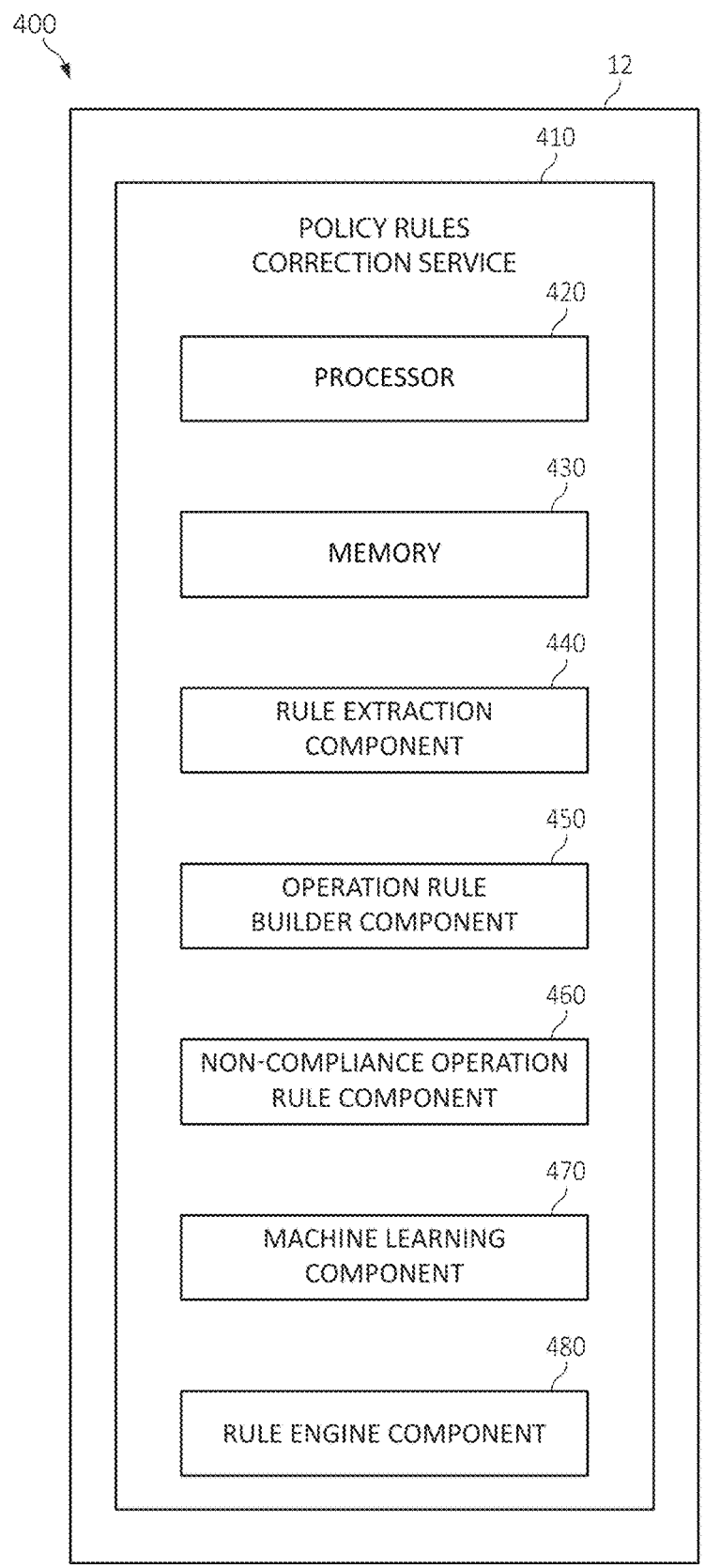
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A policy rules correction service 410 is shown, incorporating processing unit ("processor") 420 to perform various computational, data processing and other functionality in accordance with various aspects of the present invention. The policy rules correction service 410 may be provided by the computer system/server 12 of FIG. 1. The processing unit 420 may be in communication with memory 430. The policy rules correction service 410 may include a rule extraction component 440, an operation rule builder component 450, a non-compliance operation rule component 460, a machine learning model component 470, and a rule engine component 480.

As one of ordinary skill in the art will appreciate, the depiction of the various functional units in policy rules correction service 410 is for purposes of illustration, as the functional units may be located within the policy rules correction service 410 or elsewhere within and/or between distributed computing components.

The rule extraction component 440 may extract one or more operational rules from a knowledge graph, a domain knowledge, or a combination thereof describing one or more operational policies and conditions and apply the one or more operational rules to operational data to identify and filter non-compliant operational data.

In one aspect, the rule extraction component 440 may identify one or more non-formalized rules from one or more segments of text data. The rule extraction component 440 may identify data relating to the one or more rules according to a knowledge domain. The rule extraction component 440 may ingest the text data from the policy data source upon processing the text data using a lexical analysis, parsing, extraction of concepts, semantic analysis, a machine learning operation, or a combination thereof, and/or use natural language processing (NLP) to determine the set of operational rules as knowledge graphs (with an associated weight/confidence score) from one or more segments of text data.

The operation rule builder component 450 may formalize and build the one or more extracted operational rules from a knowledge graph, a domain knowledge, or a combination thereof describing one or more operational policies and conditions. The operation rule builder component 450 may assign a score to the one or more operational rules indicating a probability of compliance or non-compliance for the operational data.

The non-compliance operation rule component 460 may create one or more non-compliant operational rules from the one or more operational rules to identify and filter the non-compliant operational data by complementing the one or more operational policies and conditions. The non-compliance operation rule component 460 may create one or more non-compliant operational rules from the one or more operational rules to identify and filter the non-compliant operational data based user feedback, historical data, or a combination thereof.

The non-compliance operation rule component 460 (and in conjunction with the machine learning component 470 if necessary) may apply the one or more operational rules to operational data and validate those of the one or more operational rules according to historical data, user feedback, selected criteria, operational data threshold, or combination thereof, which may be reflected on the weight associated to operational rules (that may be modified).

The rule engine component 480 may use the formalized operational rules together with associated weights (e.g., confidence score) and operational data and executes each of the formalized operational rules on the operational data to produce non-compliant data. It should be noted that in relation to the use of the weights, as described herein, claims may be validated by one policy rule (e.g., compliant according to one rule that for example establish a max number of physical therapy services per year per patient) and uncompliant (e.g., invalid) according to another policy rule (e.g., a rule which specifies a daily limit of a physical therapy service per patient). The weights may be used to calculate a probability or percentage that a claim in uncompliant and invalid as compared to being compliant and valid.

The machine learning component 470 may learn those of the one or more policies or conditions from the knowledge graph that identify the operational data as being non-compliant operational data from historical data, user feedback, one or more non-compliant operational rules, or a combination thereof. The machine learning component 470 may learn, determine, or identify the non-compliant operational data relating one or more non-compliant operational rules and one or more user-provided modifications to the one or more rules, and/or revise the one or more operational rules according to collected feedback from a user.

By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
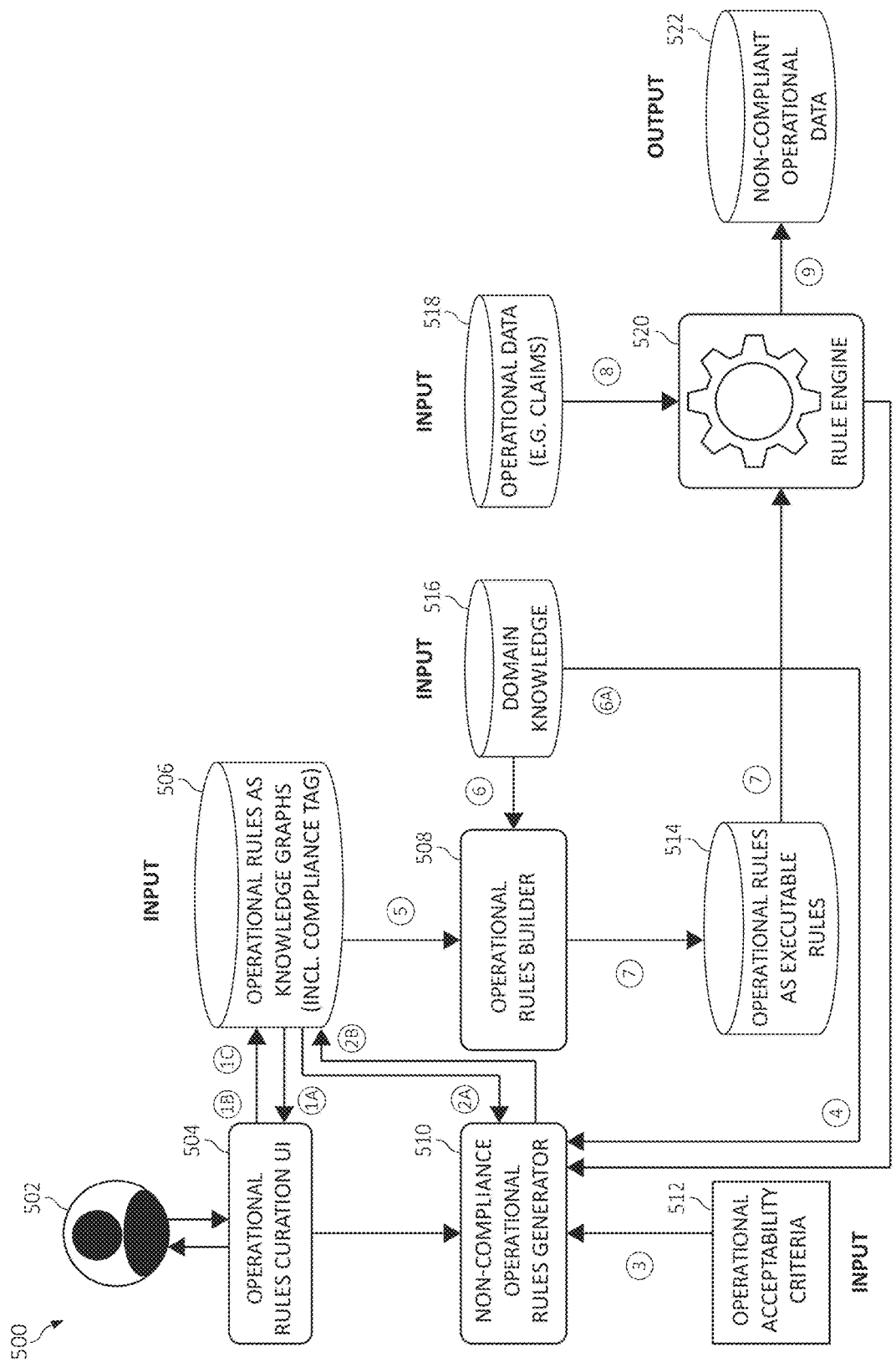
FIG. 5 is a flow diagram for intelligent learning and application of operational rules to operational data in accordance with aspects of the present invention.

Turning now to FIG. 5, block/flow diagram 500 is depicting for managing regulatory compliance for an entity. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5.

As shown, the various blocks of functionality are depicted with arrows designating the blocks' 500 relationships with each other and to show process flow. Additionally, descriptive information is also seen relating each of the functional blocks 500. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere.

As a preliminary matter, it should be noted that an operational rule may be included in and/or defined as a knowledge graph. The knowledge graph may include one or more conditions and associated values and include a tag. The tag may indicate operational compliance, operational non-compliance, or missing information. The operational rule may also be in a structured format such as, for example, an executable rule having a body (which may correspond to assumptions) and a head (which may correspond to a conclusion) where the head is valid or invalid. That is, the knowledge graph may represent conditions and values of an operation rule(s) (e.g., FIG. 6A) that needs to be converted (translated or formalized) into executable rules so that they can be executed automatically by a rule engine.

In an additional aspect, the knowledge graph ("KG") may be a graph-theoretic knowledge representation one or more model entities and attribute values as nodes, and relationships and attributes (e.g., conditions) as labeled, directed edges.

Starting in block 502, one or more users can validate and/or curate compliance and non-compliance operational rules (e.g., business rules), and/or assist in operational rule building using a user interface ("UP") 504 of a computer (e.g., operational rules curation UI). The UI 504 enables the user to observe, search, locate, and/or access list of all operational rules (e.g., compliance operational rules and non-compliance operational rules) from the operational rules forming the knowledge graph 506, as depicted in step 1A. In one aspect, the UI 504 enables a user to 1) add a missing compliance tag to be added to an operational rule in the knowledge graph 506 if necessary, and/or change a compliance tag and/or the operational rule, as in block 1B. The UI 504 enables a user to assist or complement a compliance operational rule with one or more corresponding non-compliance operational rules, as in block 1C.

The non-compliance operational rule generator 510 may receive (as input) operational rules describing compliance and represented as the knowledge graph 505, as in block 2A. The non-compliance operational rule generator 510 may also receive (as input) operational acceptability criteria 512, as in block 3, describing when an operational rule is "acceptable," (e.g., a rule may be acceptable if the rule doesn't invalidate more that 10% of the operational data (e.g., claims)).

The non-compliance operational rule generator 510 may receive (as input) information of interest from a domain knowledge 516 when an operational rule (which has been converted into an executable data structure format through an operational rule builder 508) is executed against operational data, as in block 4. The output of non-compliance operational rule generator 510 is one or more operational rules (e.g., represented as knowledge graph 506) that describe non-compliance, as in block 2B. The non-compliance generated rules may be further shown to the user (as in block 1A) through the UI 504 for validation.

It should be noted that the present invention may provide for "complementarity" of condition-values (e.g., "flipping" a condition-value). To illustrate, an operational rule may be represented as part of the knowledge graph 506 that includes a set of condition-value pairs such as, for example, a service may be equal to physical therapy ("PT") and/or occupational therapy ("OT") (e.g., service=PT/OT), an age of a user may be equal to 18 for a user where the minimum age condition is required to be greater than 18 (e.g., minimum age=18 (age >18), and the minimum number of PT/OT that provided is 4 for the user where the minimum number of units condition required is greater than 4 (e.g., minimum units=4 (units>4), and authorization for providing coverage of the services is to receive prior authorization "PAR" (e.g., requirement=PAR (prior authorization). Thus, each condition-value can be "complemented" in a way that can be defined by the user or can be learn (e.g., by leveraging block 1C) or defined in one or more constraints of the domain knowledge 516, as in block 6A (e.g., disjoint properties or disjoint values). For example, the requirement that age is greater than 18 (e.g., age >18) can be complemented by the inverse requirement that the age is less than 18 (e.g., age <18), the authorization requirement condition requires prior authorization (e.g., requirement=PAR) can be complemented by either the absence of a requirement or by no conditional requirement of receiving PAR (e.g., "requirement=not(PAR)" and/or the requirement has any value other than PAR).

The non-compliance operational rule generator 510 can be implemented comprising of two sub-components for generating non-compliance operational rules. The first subcomponent may be 1) performing brute force generation of non-compliance rules such as, for example by "complementing" each one of the condition values or their combinations (e.g., by complementing a combination of condition values) such as, for example, illustrated in the following examples:

For:
Service=PT/OT, age>18, units>64, requirement=PAR, tag=compliance generate
Service=not(PT/OT), age>18, units>64, requirement=PAR, tag=non-compliance
Service=not(PT/OT), age>18, units>64, requirement=PAR, tag=non-compliance
Service=PT/OT, age<=18, units>64, requirement=PAR, tag=non-compliance
Service=PT/OT, age>18, units<=64, requirement=PAR, tag=non-compliance
Service=PT/OT, age>18, units>64, requirement=not(PAR), tag=non-compliance
Service=PT/OT, age>18, units>64, tag=non-compliance The first subcomponent may be 2) learning from user feedback (e.g., historical data) such as, for example, using block 1C (e.g., complement a compliance operational rule with one or more corresponding non-compliance operational rules) to understand which part of the compliance operational rule needs to be "complemented" to generate one or more non-compliance operational rules. For example, block 1C may include:

For
Service=PT/OT, age>18, units>64, requirement=PAR, tag=compliance
Service=PT/OT, age>18, units>64, tag=non-compliance
Service=PT/OT, age>18, units>64, requirement=not(PAR), tag=non-compliance Thus, if a statistically significant amount of compliance rules containing conditions (e.g., service, age, units, requirement "PAR") that became non-compliance rules by "complementing" requirement or its value is observed (e.g., by differences), then the present invention (e.g., the non-compliance operational rule generator 510) can complement the requirement to auto-generate non-compliance rules when this combination of conditions occurring in compliance rules.

The non-compliance operational rule generator 510 can be implemented comprising of two sub-components for validating non-compliance operational rules. Using operational data (e.g., submitted policy claims) to validate candidate non-compliance operational rules, the non-compliance operational rule generator 510 may execute non-compliance generated rules applied on top of operational data to see a distribution of invalid claims. Different operational acceptability criteria 512 may be applied to decide on the validity of the rules on top of the operational data (e.g., a percentage ("%") or distributions of claims that should be valid/invalid), since such can filter out irrelevant or noisy benefit rules. The operational acceptability criteria 512 may be specified by the user 502 or mined from historical data. For example, it may be determined from historical data approximately 7.3% of the claims are fraudulent. Then, if a rule flags 80% of claims as fraudulent it may be determined the operational rule is above the threshold percentage is determined to be an ineffective rule (e.g., "not a good rule"). In addition, the non-compliance operational rule generator 510 can filter out non-compliant candidate rules that are in conflict with (user validated) similar compliant rules such as, for example: "Service=PT/OT, age>18, units>64, requirement=PAR, tag=compliance." If the unit condition is flipped to create a new non-compliant rule: "Service=PT/OT, age>18, units<64, requirement=PAR, tag=non-compliance." This new rule may contradict another existent rule that says that all members may receive up to 64 units of service without requiring a prior authorization (PAR). In that case, the new candidate rule can be filtered out as it is in conflict with (or already covered by) an existent rule.

In an additional aspect, an operational rule builder 508 (e.g., a "business rules builder") may use (as input) the knowledge graphs 506 representing one or more operational rules, as in block 5, and combine the one or more operational rules with domain knowledge 51, as in block 6, to formalize the one or more operational rules into an executable format with a head and body (i.e., compliance operational rules) that can automatically overlay and/or filter claims.

The operational rule builder 508 may be implemented using a brute force search on top of the knowledge graph 506 and domain knowledge 516 to discover one or more relations among a set of grounded predicates such as, for example, introducing variables to generalize the grounded information in order to construct a first order of logical rules (i.e., heads and bodies) based on a machine learning probabilistic logic.

The operational rule builder 508 may also weight each operational rule by performing an optimization operation (e.g., a Quasi-Newton optimization algorithms) using grounded predicates in the knowledge graph 506 as training data. The operational rule builder 508 may produce/output a set of executable operational rules (of the form body and head) together with associated weights, as in block 7.

The domain knowledge 516 may include an ontology, defined mappings from conditions in the knowledge graph 506 to fields in the operational data (e.g., claims) or other domain knowledge 516 sources (e.g., lexicons, dictionaries, definitions).

The domain knowledge 516 may be used to link (e.g., map) one or more operational rules to operational data (e.g., mappings). These mappings link one or more attributes in the knowledge graph 506 to the attributes (or columns) in operational data (e.g., claims data) in order to overlay claims to the (executable) benefit rules (e.g., business rule). For example, a mapping may be which column in claims data contains a birthdate of a selected client (from which age can be extracted) and a condition(s) this maps to, which is an age range (e.g., policy member eligibility criteria) in a policy rule (e.g., minimum age and maximum age). The mappings can be provided as input or extracted semi-automatically using data linking techniques.

The rule engine 520 may use (as input) one or more of the executable operational rules 514 together with associated weights, from block 7, as well as any operational data, from block 8, and executes the executable operational rules 514 on top of the operational data. The rule engine 510 may outputs non-compliant data (e.g., non-compliant operational data or non-compliant claims), as in block 522. The rules engine may be implemented as marginal inference such as, for example, Monte Carlo sampling or variational inference and/or over a Markov Logic Network (e.g., defined by the executable operational rules 514 and their associated weights).

Figure 6A:
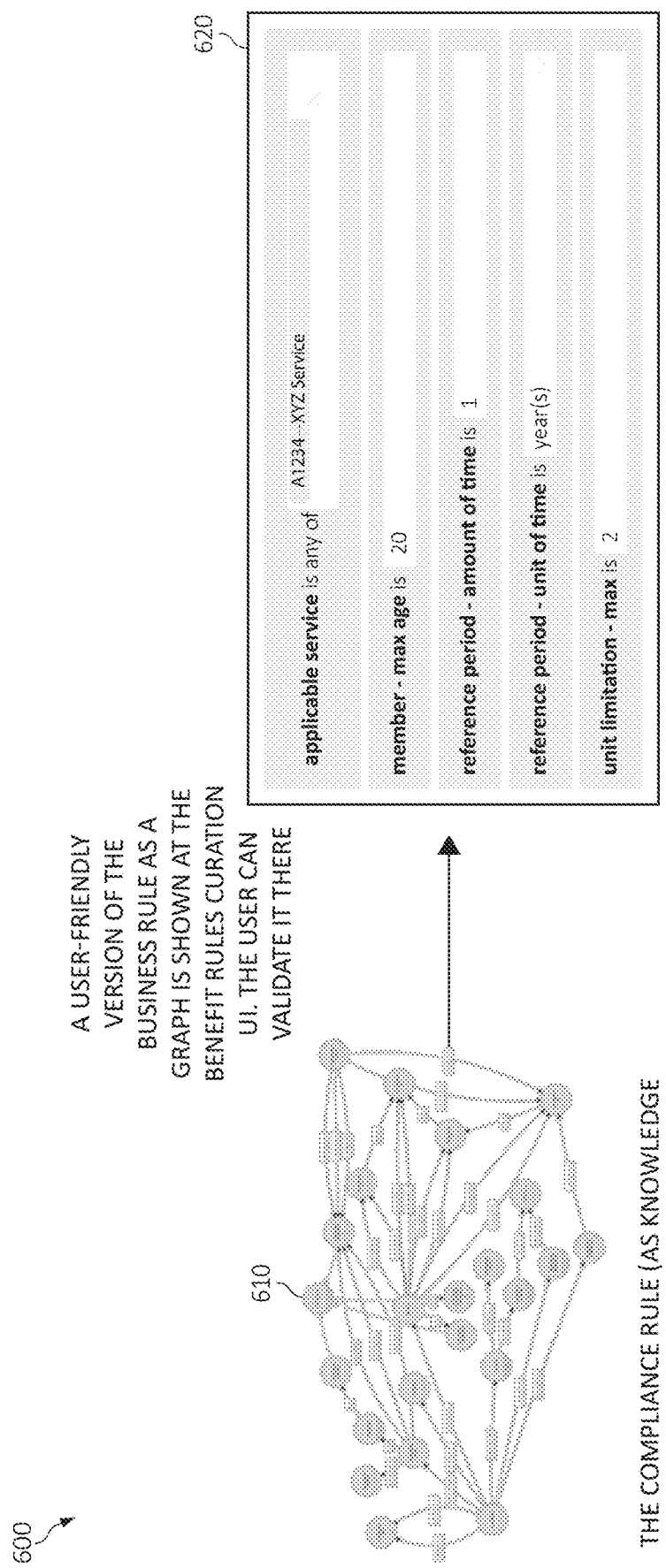
FIGS. 6A-6B is diagram depicting intelligent learning and application of operational rules to operational data to identify policy violations in which aspects of the present invention may be realized.
Figure 6B:
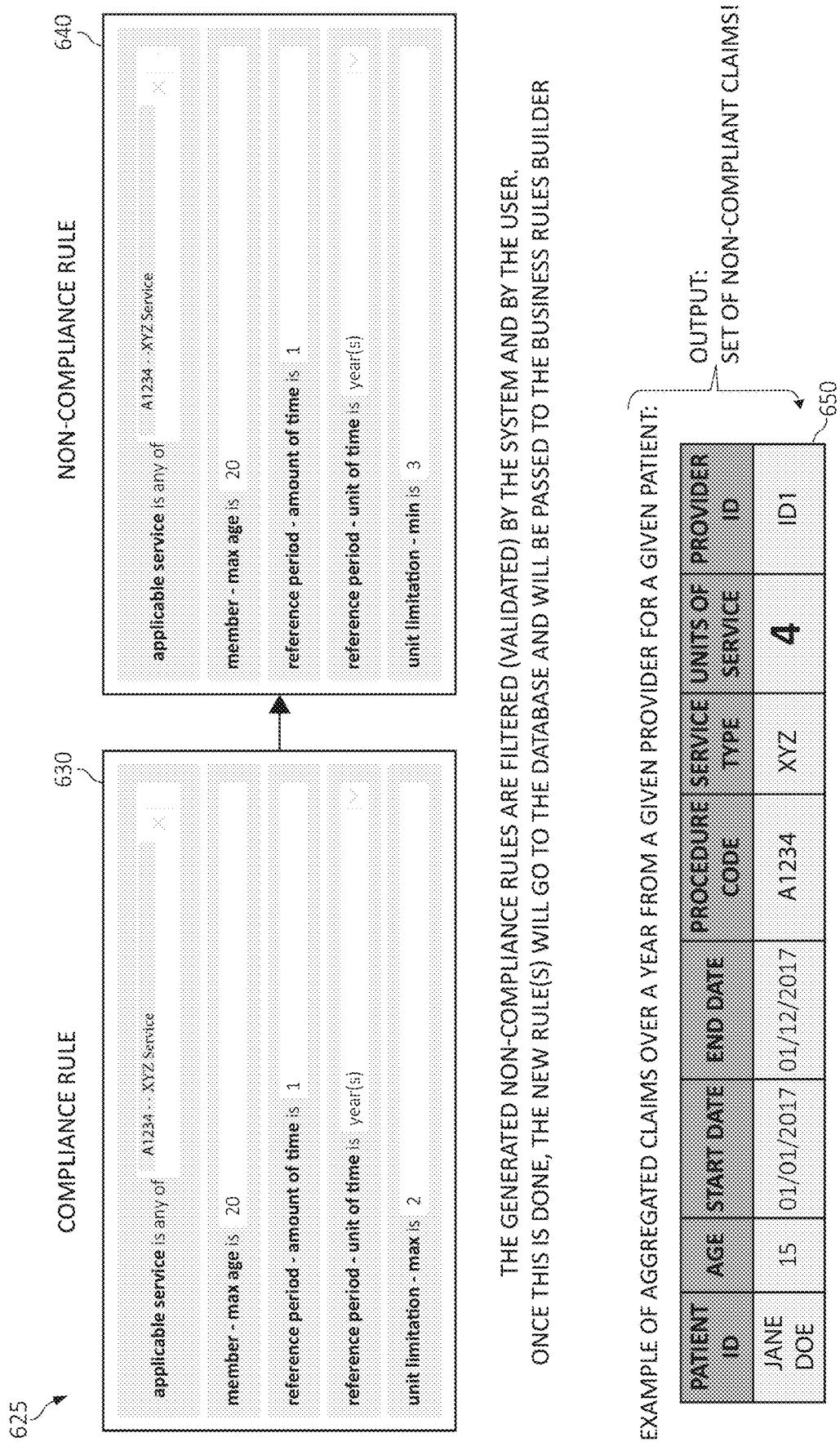

In view of the foregoing components of FIGS. 1-5, consider the following example of implementing intelligent learning and application of operational rules to operational data to identify policy violations, as illustrated in FIGS. 6A-6B. Also, one or more components, functionalities, and/or features of FIGS. 1-5 may be implemented in FIGS. 6A-6B. Repetitive description of like elements, components, modules, services, applications, and/or functions employed in other embodiments described herein is omitted for sake of brevity.

In one aspect, a knowledge graph 610 (e.g., the knowledge graph 506 of FIG. 5), which may function as a database, may be provided and used to provide one or more compliance rule. It should be noted that the knowledge graph 610 may also contain uncompliant rules, either because they were automatically extracted from policy or added directly by users. Although most policies describe compliance criteria (which is why a need exists for a non-compliance operational rules generator), in some cases the policies also mention what should not be done (e.g., topical fluoride is not covered for children). The knowledge graph 610 may be used as input to that represents an operational rule (e.g., a policy benefit rule) extracted from a selected domain policy (e.g., "XYZ" service such as, for example, a dental policy for a dental service). The operational rule (e.g., a policy benefit rule) in this example includes a conditions (and corresponding values) that a claim needs to fulfill to be valid, which would then receive a compliance tag). For example, the example condition and benefit for such policy may be "Topical fluoride is a covered benefit for child members through age 20 and topical fluoride treatments are allowed twice (2) per year for child members" (for the service type of "XYZ" having procedure code A1234 such as, for example, a dental policy for a dental service for patient identifier "Jane Doe").

In one aspect, a user-friendly version of the operational rule as the knowledge graph 610 may be reconfigured and provided as the UI 620 (e.g., the Benefit Rules Curation UI 504 of FIG. 4). Thus, the UI 620 may provide the various conditions of the operational rule such as, for example, the service (e.g., topical fluoride), a members age (e.g., up through the age 20), a number of times the service is provided (e.g., 1 time per year), and a maximum unit limitation (e.g., 2).

As illustrated in FIG. 6B, the compliance operational rule 630 may be processed through the non-compliance rules generator (e.g., non-compliance rules generator 510 of FIG. 5) and a new non-compliance rules 640 may be generated/created. The generated non-compliance rule(s) 640 may be filtered (e.g., validated) by the -compliance operational rule generator 510 and by the user (e.g., user 504 of FIG. 5). Once this is performed, the new operational rule(s) 640 may go to a database and be passed to the operational rules builder 508.

It should be noted, in one aspect, each candidate non-compliance rule may be discarded. For example, assume a candidate non-compliance rule "C1" is discarded: 1) when executed on top of operational data (e.g., a claim), the candidate non-compliance makes a large number of claims invalid beyond an invalid claim expectancy threshold (e.g., beyond an expected number invalid claims defined by the operational acceptability criteria 512 of FIG. 5 such as, for example, there are 30% of claims invalidated, while historically a noncompliance rule invalidates only between 3-9% of the data thus causing the, so candidate non-compliance rule "C1" to be determined as an inefficient/not a good candidate rule), 2) if there is another operational rule that is already covering non-compliance criteria for the conditions and values included in candidate non-compliance rule "C1" so thus candidate non-compliance rule "C1" may be discarded as a candidate, and/or 3) if there is another operational rule that already covers compliance criteria for the conditions and values included in candidate non-compliance rule, and therefore the candidate non-compliance rule it is in conflict with an existent compliance rule (in particular if the compliance rule has been validated by users).

Alternatively, a non-compliance generated rule may also be prevented from being discarded. For example, non-compliance generated rule (e.g., candidate non-compliance rule "C1") may be retained (e.g., not discarded) when the non-compliance generated rule is executed on top of the operational data, and candidate non-compliance rule "C1" does not apply to any claims (i.e., candidate non-compliance rule "C1" does not invalidate any claim). Thus, the candidate non-compliance rule "C1" is shown to the user, and the user confirms candidate non-compliance rule "C1" is an efficient/good candidate non-compliance rule and thus it is stored/retained as a new (user-validated) rule and assigned a confidence score. Also, the candidate non-compliance rule "C1" may be retained when executed on top of operational data and candidate non-compliance rule "C1" makes an "acceptable" number of claims invalid claims (e.g., 2%) such as, for example, determines an acceptable number of claims below a defined threshold that fits the operational acceptability criteria 512 of FIG. 5. The candidate non-compliance rule "C1" determined to be an efficient/good candidate non-compliance rule and thus it is stored/retained to be shown to the user for further validation.

Each validated non-compliance operational rule may be passed to the operational rule builder 508, which is formalizing the non-compliance operational rules into a 1st order logic rules. For example, the validated non-compliance operational rule C1 may be as follows in the sample pseudo-code: (C1: Claim(c)^Service(x)^Child(y)^ has Service(x,y)^ has Units(x,u)^[u>=3]=>IsInvalid(c))—where x, y, and c may be user defined parameter values for each condition.

The validated non-compliance operational rule (in an executable form) may be passed to the rules engine 520 of FIG. 5 that executes the validated non-compliance operational rule on top of claims data and outputs a set of non-compliant claims 650. For example, the set of non-compliant claims 650 may be representative of aggregated claims over a selected period of time (e.g., year) from a selected provider for a selected user (e.g., patient).

Figure 7:
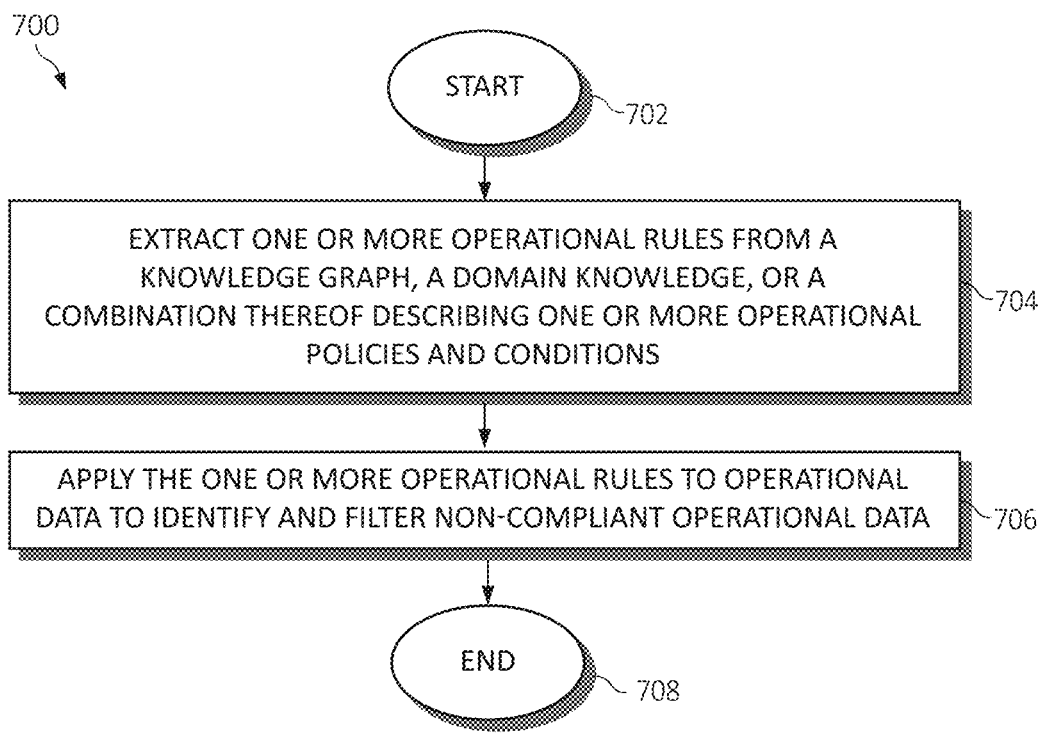
FIG. 7 is a flowchart diagram depicting an exemplary method for implementing intelligent learning and application of operational rules to operational data in a computing environment according to an embodiment of the present invention by a processor, in which aspects of the present invention may be realized.

Turning now to FIG. 7, a method 700 for implementing intelligent learning and application of operational rules to operational data using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

One or more operational rules may be extracted and formalized from a knowledge graph, a domain knowledge, or a combination thereof describing one or more operational policies and conditions, as in block 704. The one or more operational rules may be applied to operational data to identify and filter non-compliant operational data, as in block 706. The functionality 700 may end, as in block 708.

In one aspect, in conjunction with and/or as part of at least one blocks of FIG. 7, the operations of 700 may include each of the following. The operations of 700 may ingest text data from a knowledge domain upon processing the text data using a lexical analysis, parsing, extraction of concepts, semantic analysis, a machine learning operation, or a combination thereof, and/or use natural language processing (NLP) to determine the set of rules from one or more segments of text data.

The operations of 700 may assign a score to the one or more operational rules indicating a probability of compliance or non-compliance for the operational data.

The operations of 700 may create one or more non-compliant operational rules from the one or more operational rules to identify and filter the non-compliant operational data by complementing the one or more operational policies and conditions, and/or create one or more non-compliant operational rules from the one or more operational rules to identify and filter the non-compliant operational data based user feedback, historical data, or a combination thereof.

The operations of 700 may learn those of the one or more policies or conditions from the knowledge graph that identify the operational data as being non-compliant operational data from historical data, user feedback, one or more non-compliant operational rules, or a combination thereof.

The operations of 700 may apply the one or more operational rules to operational data and/or validate those of the one or more operational rules according to historical data, user feedback, selected criteria, operational data threshold, or combination thereof. The operations of 700 may initialize a machine learning mechanism to 1) learn, determine, or identify the non-compliant operational data relating one or more non-compliant operational rules and one or more user-provided modifications to the one or more rules, and/or 2) revise the one or more operational rules according to collected feedback from a user. The operations of 700 may collect feedback from a user for learning modifications to the one or more rules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for implementing intelligent application of operational rules in a computing environment by a processor comprising:

extracting one or more operational rules from a combination of:
a knowledge graph constructed by processing at least textual data from one or more policy documents, the policy documents including policy criteria therein; and
a domain knowledge describing one or more operational policies and conditions,
wherein the one or more operational rules are each in a structured format including information structured into a body corresponding to one or more assumptions of the conditions, and a head corresponding to a conclusion having a value of valid or invalid, and wherein the information of the one or more operational rules are represented in the knowledge graph and necessitate formalizing to convert the one or more operational rules into one or more executable rules automatically executable by a rule engine;

for each respective operational rule of the one or more operational rules, generating candidate non-compliant operational rules by flipping a condition value of a rule condition of each combination of condition-value pairs of the respective operational rule to represent an inverse of the rule condition of each combination of the condition-value pairs, wherein each of the flipped condition values of the rules of each combination of condition-value pairs is output as a list of complemented condition values;

identifying, from the list of complemented condition values, which of the combination of condition-value pairs necessarily is complemented to transform the respective operational rule into one of the candidate non-compliant operational rules, wherein the identifying is performed by determining a statistically significant number of the one or more operational rules become non-compliant rules when the identified combination of condition-value pairs exists on the list of complemented condition values;

executing machine learning logic using the one or more operational rules, the knowledge graph, and the domain knowledge as training data to generate one or more noncompliant operational rules, wherein the one or more non-compliant operational rules comprise those of the candidate non-compliant operational rules that, when applied to operational data, invalidate fewer than a predetermined percentage of claims defined by the one or more operational policies and conditions;

updating the one or more operational rules to incorporate the one or more non-compliant operational rules;

applying the updated one or more operational rules, having incorporated the one or more noncompliant operational rules, to the operational data; and identifying and filtering non-compliant operational data using the applied updated one or more operational rules.

2. The method of claim 1, further including assigning a score to the one or more operational rules indicating a probability of compliance or non-compliance for the operational data.

3. The method of claim 1, further including creating the one or more non-compliant operational rules from the one or more operational rules based on user feedback, operational acceptability criteria, historical data, or a combination thereof.

4. The method of claim 1, further including learning those of the one or more policies or conditions from the knowledge graph that identify the operational data as being noncompliant operational data from historical data, user feedback, one or more non-compliant operational rules, or a combination thereof.

5. The method of claim 1, further including:
applying the updated one or more operational rules to operational data; and
validating the updated one or more operational rules according to historical data, user feedback, selected criteria, operational data threshold, or combination thereof.

6. The method of claim 1, further including initializing a machine learning mechanism to:
learn, determine, or identify the non-compliant operational data relating one or more non-compliant operational rules and one or more user-provided modifications to the one or more non-compliant rules; and
revise the one or more operational rules according to collected feedback from a user.

7. A system for implementing intelligent application of operational rules in a computing environment, comprising:

one or more processors with executable instructions that when executed cause the system to:
extract one or more operational rules from a combination of:
a knowledge graph constructed by processing at least textual data from one or more policy documents, the policy documents including policy criteria therein; and
a domain knowledge describing one or more operational policies and conditions,
wherein the one or more operational rules are each in a structured format including information structured into a body corresponding to one or more assumptions of the conditions, and a head corresponding to a conclusion having a value of valid or invalid, and wherein the information of the one or more operational rules are represented in the knowledge graph and necessitate formalizing to convert the one or more operational rules into one or more executable rules automatically executable by a rule engine;
for each respective operational rule of the one or more operational rules, generate candidate non-compliant operational rules by flipping a condition value of a rule condition of each combination of condition-value pairs of the respective operational rule to represent an inverse of the rule condition of each combination of the condition-value pairs, wherein each of the flipped condition values of the rules of each combination of condition-value pairs is output as a list of complemented condition values;
identify, from the list of complemented condition values, which of the combination of condition-value pairs necessarily is complemented to transform the respective operational rule into one of the candidate non-compliant operational rules, wherein the identifying is performed by determining a statistically significant number of the one or more operational rules become non-compliant rules when the identified combination of condition-value pairs exists on the list of complemented condition values;
execute machine learning logic using the one or more operational rules, the knowledge graph, and the domain knowledge as training data to generate one or more noncompliant operational rules, wherein the one or more non-compliant operational rules comprise those of the candidate non-compliant operational rules that, when applied to operational data, invalidate fewer than a predetermined percentage of claims defined by the one or more operational policies and conditions;
update the one or more operational rules to incorporate the one or more non-compliant operational rules;
apply the updated one or more operational rules, having incorporated the one or more noncompliant operational rules, to the operational data; and
identify and filter non-compliant operational data using the applied updated one or more operational rules.

8. The system of claim 7, wherein the executable instructions further assign a score to the one or more operational rules indicating a probability of compliance or noncompliance for the operational data.

9. The system of claim 7, wherein the executable instructions further create the one or more non-compliant operational rules from the one or more operational rules based on user feedback, operational acceptability criteria, historical data, or a combination thereof.

10. The system of claim 7, wherein the executable instructions further learn those of the one or more policies or conditions from the knowledge graph that identify the operational data as being non-compliant operational data from historical data, user feedback, one or more non-compliant operational rules, or a combination thereof.

11. The system of claim 7, wherein the executable instructions further:
apply the updated one or more operational rules to operational data; and
validate the updated one or more operational rules according to historical data, user feedback, selected criteria, operational data threshold, or combination thereof.

12. The system of claim 7, wherein the executable instructions further initialize a machine learning mechanism to:
learn, determine, or identify the non-compliant operational data relating one or more non-compliant operational rules and one or more user-provided modifications to the one or more non-compliant rules; and
revise the one or more operational rules according to collected feedback from a user.

13. A computer program product for, by one or more processors, implementing intelligent application of operational rules in a computing environment, the computer program product comprising a non-transitory computer-readable storage medium having computer-readable program code portions stored therein, the computer-readable program code portions comprising:
an executable portion that extracts one or more operational rules from a combination of:
a knowledge graph constructed by processing at least textual data from one or more policy documents, the policy documents including policy criteria therein; and
a domain knowledge describing one or more operational policies and conditions,
wherein the one or more operational rules are each in a structured format including information structured into a body corresponding to one or more assumptions of the conditions, and a head corresponding to a conclusion having a value of valid or invalid, and wherein the information of the one or more operational rules are represented in the knowledge graph and necessitate formalizing to convert the one or more operational rules into one or more executable rules automatically executable by a rule engine;
an executable portion that, for each respective operational rule of the one or more operational rules, generates candidate non-compliant operational rules by flipping a condition value of a rule condition of each combination of condition-value pairs of the respective operational rule to represent an inverse of the rule condition of each combination of the condition-value pairs, wherein each of the flipped condition values of the rules of each combination of condition-value pairs is output as a list of complemented condition values;
an executable portion that identifies, from the list of complemented condition values, which of the combination of condition-value pairs necessarily is complemented to transform the respective operational rule into one of the candidate non-compliant operational rules, wherein the identifying is performed by determining a statistically significant number of the one or more operational rules that become non-compliant rules when the identified combination of condition-value pairs exists on the list of complemented condition values;
an executable portion that executes machine learning logic using the one or more operational rules, the knowledge graph, and the domain knowledge as training data to generate one or more non-compliant operational rules, wherein the one or more non-compliant operational rules comprise those of the candidate non-compliant operational rules that, when applied to operational data, invalidate fewer than a predetermined percentage of claims defined by the one or more operational policies and conditions;

an executable portion that updates the one or more operational rules to incorporate the one or more non-compliant operational rules;

an executable portion that applies the updated one or more operational rules, having incorporated the one or more non-compliant operational rules, to the operational data; and an executable portion that identifies and filters non-compliant operational data using the applied updated one or more operational rules.

14. The computer program product of claim 13, further including an executable portion that assigns a score to the one or more operational rules indicating a probability of compliance or non-compliance for the operational data.

15. The computer program product of claim 13, further including an executable portion that creates the one or more non-compliant operational rules from the one or more operational rules based on user feedback, operational acceptability criteria, historical data, or a combination thereof.

16. The computer program product of claim 13, further including an executable portion that learns those of the one or more policies or conditions from the knowledge graph that identify the operational data as being non-compliant operational data from historical data, user feedback, one or more non-compliant operational rules, or a combination thereof.

17. The computer program product of claim 13, further including an executable portion that:
   applies the updated one or more operational rules to operational data; and
   validates the updated one or more operational rules according to historical data, user feedback, selected criteria, operational data threshold, or combination thereof.

18. The computer program product of claim 13, further including an executable portion that initializes a machine learning mechanism to:
   learn, determine, or identify the non-compliant operational data relating one or more non-compliant operational rules and one or more user-provided modifications to the one or more non-compliant operational rules; and
   revise the one or more operational rules according to collected feedback from a user.

* * * * *